July 29, 1969   H. F. STEMKE   3,458,256
BI-DIRECTIONAL FILM PRINTING APPARATUS
Filed Aug. 14, 1967   7 Sheets-Sheet 2
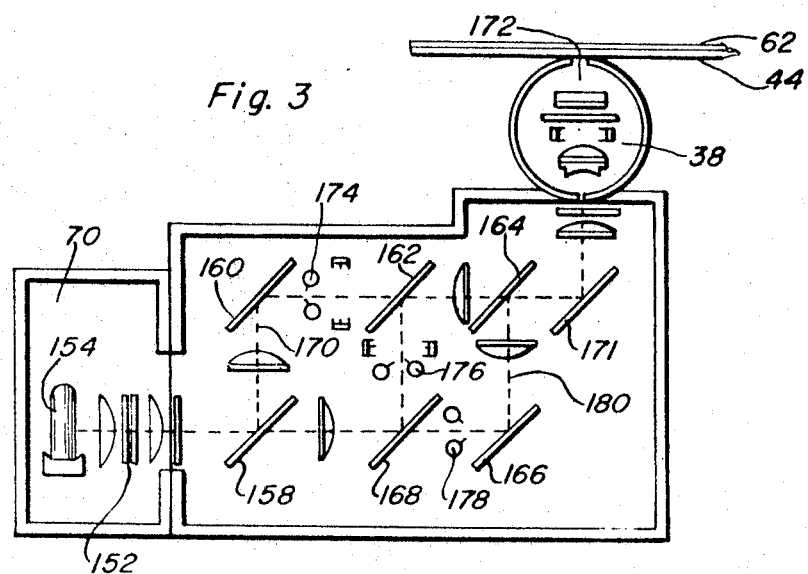
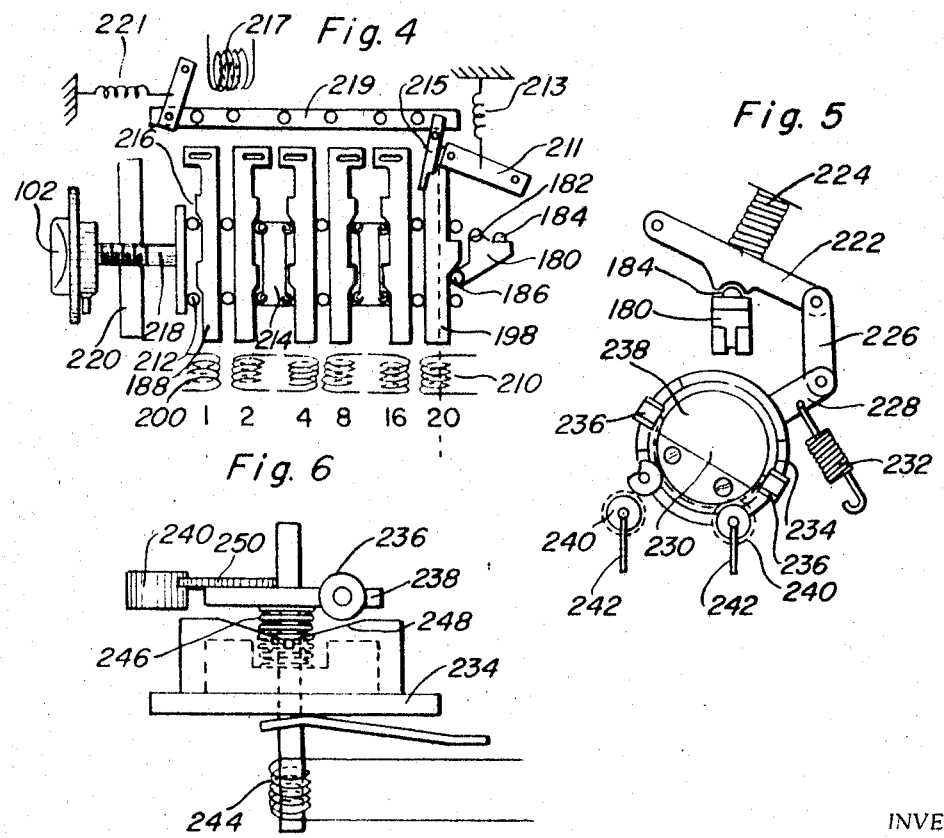
INVENTOR.
HENRY F. STEMKE
PENDLETON, NEUMAN
SEIBOLD & WILLIAMS
ATTORNEYS July 29, 1969     H. F. STEMKE     3,458,256
BI-DIRECTIONAL FILM PRINTING APPARATUS
Filed Aug. 14, 1967     7 Sheets-Sheet 3
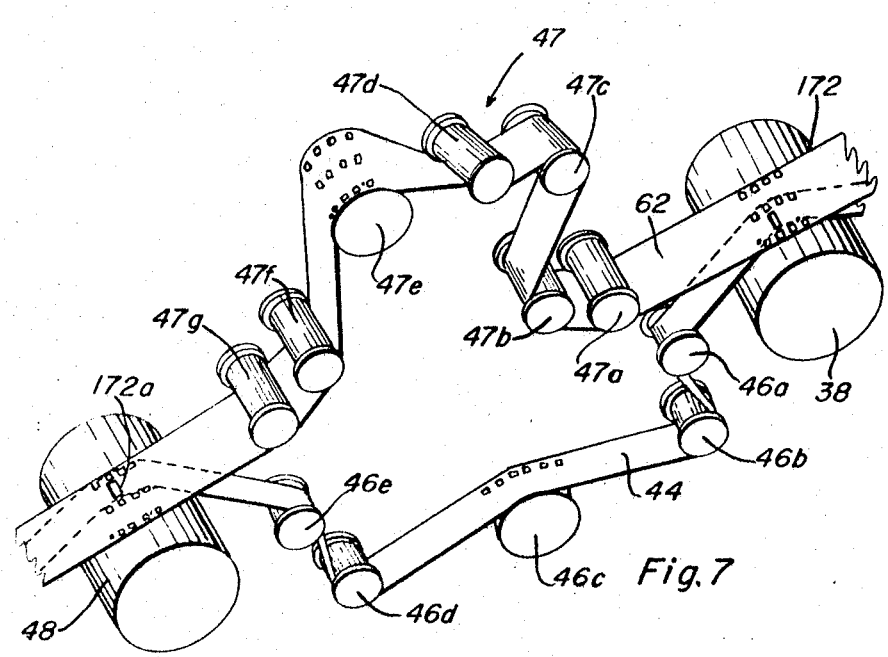
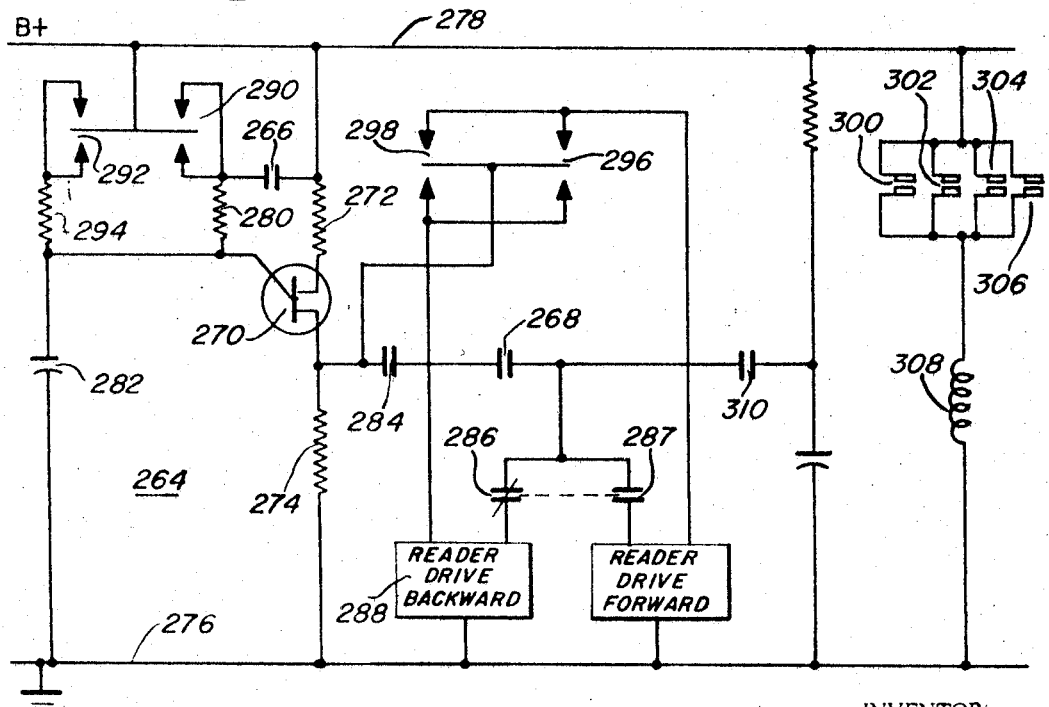
Fig. 10b
INVENTOR:
HENRY F. STEMKE
PENDLETON, NEUMAN
SEIBOLD & WILLIAMS
ATTORNEYS

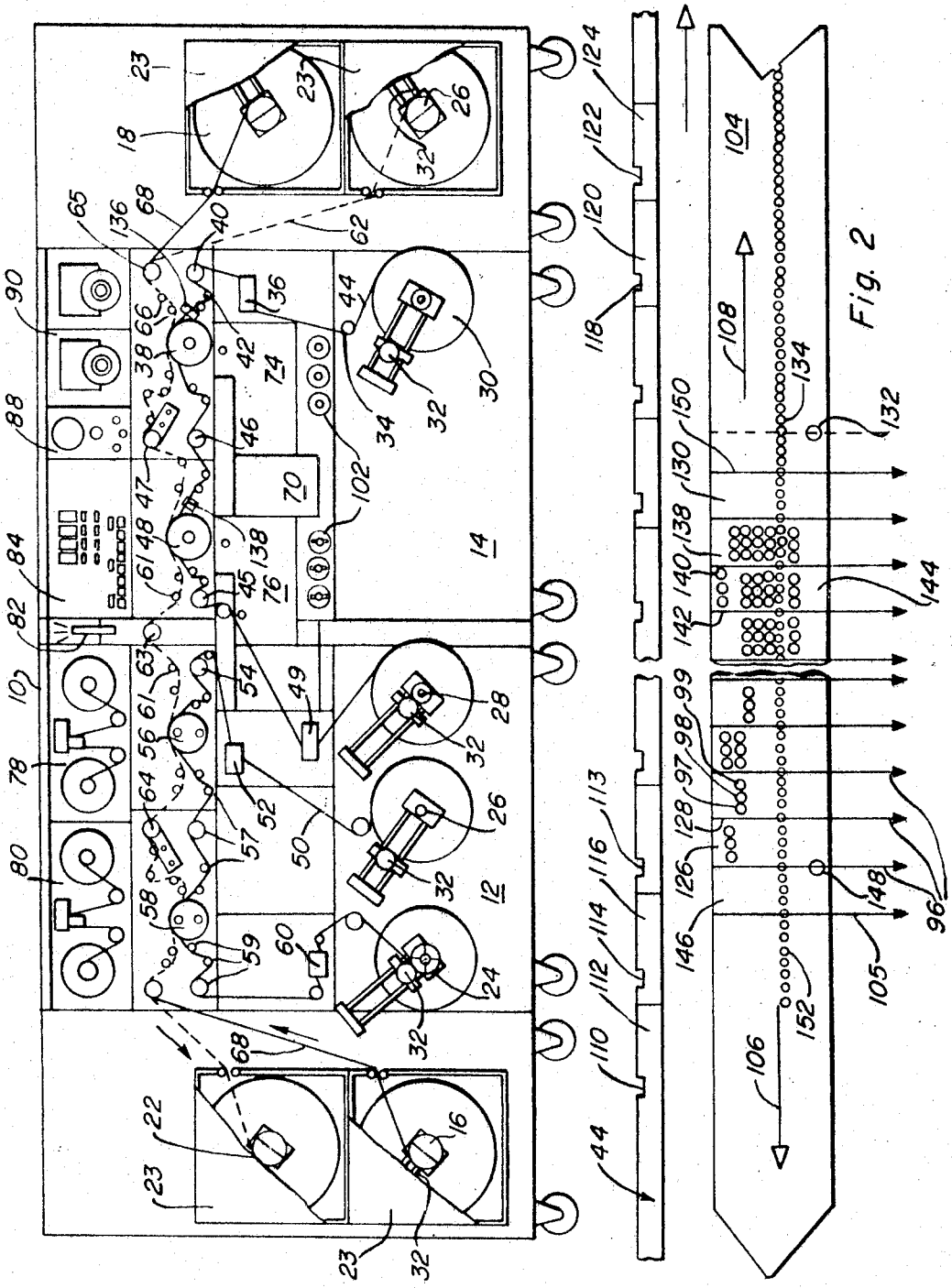

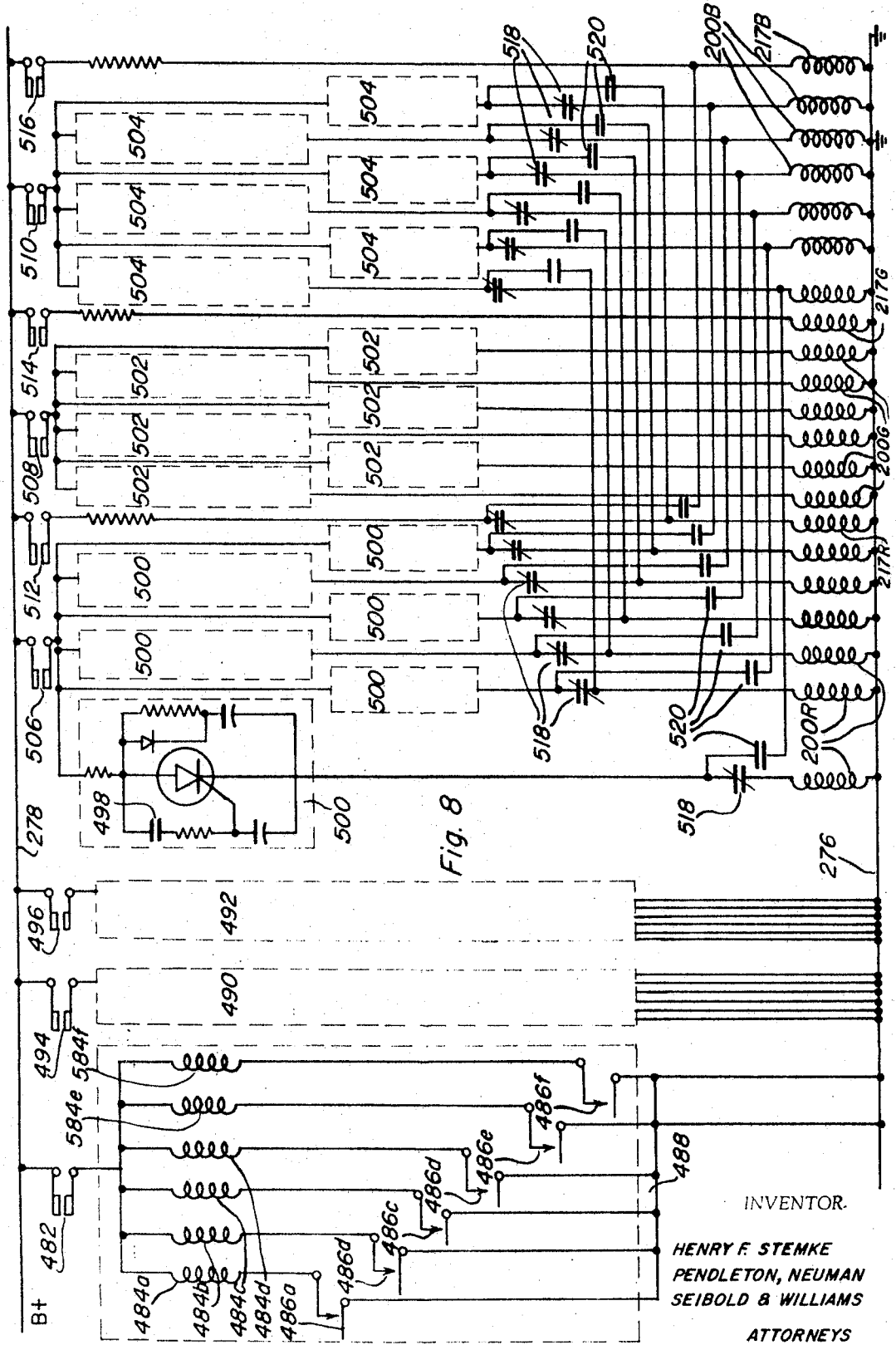

United States Patent Office 3,458,256
Patented July 29, 1969

3,458,256
BI-DIRECTIONAL FILM PRINTING APPARATUS
Henry F. Stemke, Morton Grove, Ill., assignor to Peterson Enterprises, Incorporated, Glenview, Ill., a corporation of Illinois
Filed Aug. 14, 1967, Ser. No. 660,354
Int. Cl. G03b 27/08
U.S. Cl. 355—88                                    15 Claims

ABSTRACT OF THE DISCLOSURE

An apparatus which produces multiple copies of motion picture film in color or black and white. The bi-directional mechanism utilizes a single punched tape for light control information storage. This information is coordinated with the particular film scene being printed through the use of cue marks on the original film surface. A single associated cue sensor is provided to be used irrespective of the direction of film and tape travel.

This invention is in the field of film printing apparatus and relates, more particularly, to bi-directional film printing apparatus utilizing a single punched tape for information storage to program the light sources of a motion picture printer, a single set of cuing effects on the film negative and a single cue sensor.

Since the development of the motion picture industry, it has been necessary to copy to reproduce films in multiple in order to make a given film widely available. Copying equipment of varying complexity has been available commercially since the early 1930's. The early development of the art is summarized briefly in U.S. Patent 2,990,762 relating to an automatic control device for a motion picture film printer.

As described therein, it has been and is customary to place a notch, metallic patch or some other effect on the edge of the film negative at each point where a light change in the printing apparatus is desired. Most commonly, this occurs at the time of a scene change or change in the scenic content although in some cases multiple scenes may be reproduced with the same light source or the light source may be altered during a given scene. The earliest printers sensed a notch in the film and sounded an alarm prompted an operator to manually change the light in accordance with a predetermined plan.

As described in Baumbach U.S. Patent 2,990,762, later developments provided automatic means to program the light source in accordance with a predetermined sequence released to scenic content. Such an automatic programming system has generally used a punched paper tape of a conventional type and an associated reader which actuates through appropriate circuitry the light source or sources. While U.S. Patent 2,990,762 relates to such a tape reader as an adapter for a manual machine, Baumbach et al. U.S. Patent 3,121,786 relates to an alternate automatic control system in which a plurality of filters of varying density are removed from the path of the light source by electromechanical means in accordance with a pre-punched tape program.

The two patents set forth above contemplate either mechanical aperture control or the use of filters for light control and either may be applied to the instant invention. Also, while a specific tape reader and information storage system is described in the Baumbach et al. Patent 3,121,786, any one of several commercially available punched tape readers may be readily adapted to this use, one appropriate reader being the Model 464 reader with an appropriate drive package, both of which are available from the Tally Register Corporation, Seattle, Wash. Moreover, information storage may be accomplished by alternate means such as magnetic tape or the like.

In recent years with the expanded use of color film and the need for increased production of film copies, printers have become known which control not only light intensity but color balance in the printing operation in response to an information program. At least one such printer has been made which is capable of bi-directional operation by utilizing a separate special set of notches or other cues on the film negative as well as a special tape information program.

The principal objects of this invention are to provide a unique and improved film printer for both sound and color or black and white picture content capable of bi-directional operation at increased speeds and with greatly enhanced facility.

It is a further object of this invention to provide an improved motion picture printer capable of bi-directional operation utilizing the same information storage medium, the same set of notches or other cues on the film negative and the same cue sensor for both directions.

It is another object of this invention to provide an improved motion picture film printer capable of reproducing two complete copies of a given negative sequentially in a positive synchronized relationship on a single piece of raw stock in a single operation.

In one form of this invention, a printer is provided on a large integrated planar panel with all of the controls and loading operations at a convenient working level. A single eight hole punched tape and a single set of cues on the film negative are capable of actuating the printer for bi-directional operation whereby a single negative can be processed in the backward and forward directions alternately without the necessity of rewinding or unusual film handling.

Furthermore, separate raw film supply and take-up reels are provided for the two directions of operation whereby handling of raw film is also minimized.

For a more complete understanding of this invention, reference will now be made to the accompanying drawings wherein:

FIG. 1 is an overall diagrammatic illustration of the film printer;

FIG. 2 is a schematic representation of the film negative and information storage tape;

Figure 9:
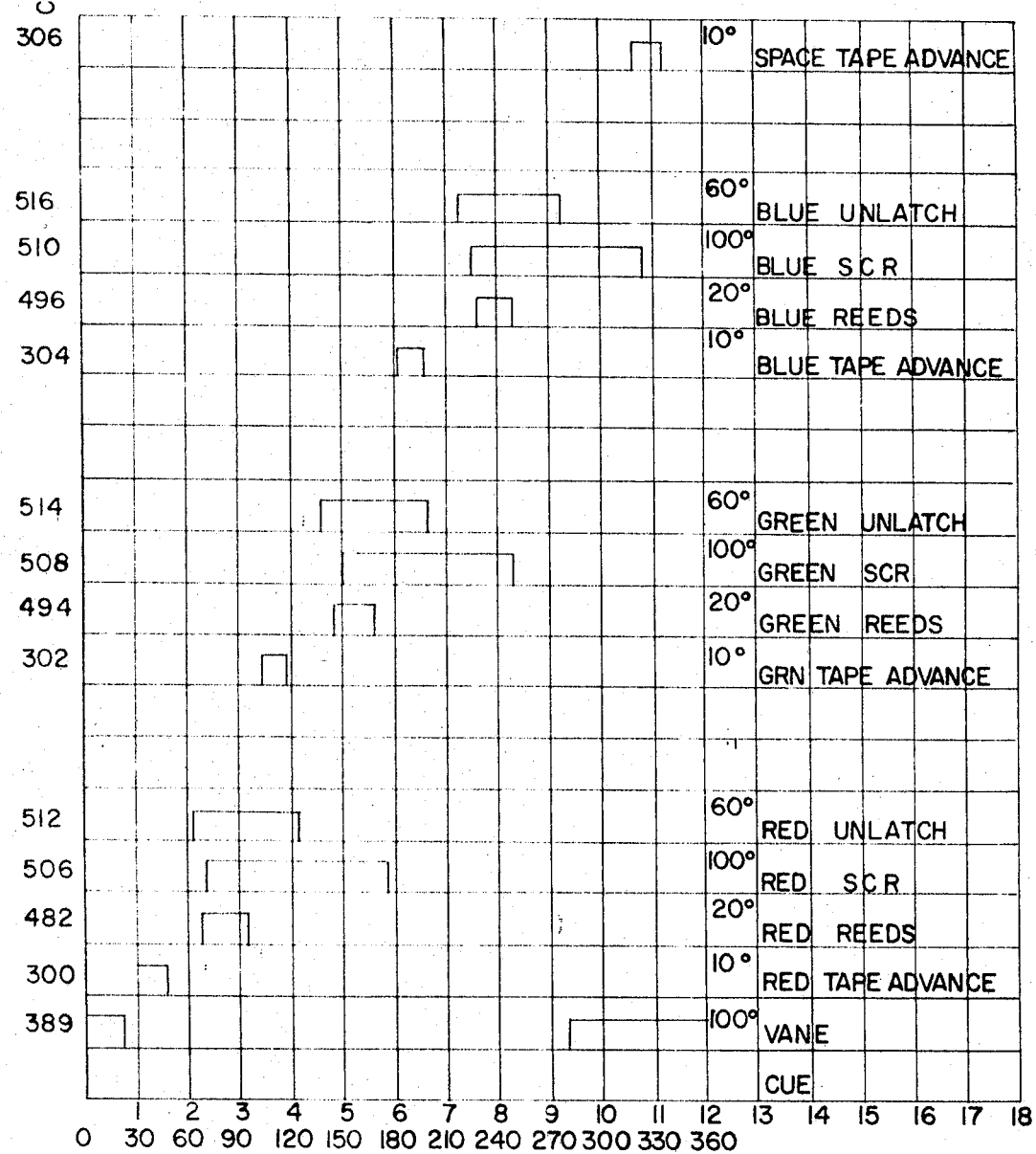

FIG. 3 diagrammatically illustrates the modulated light source;

FIG. 4 diagrammatically illustrates the information memory for the modulated light source;

FIGS. 5 and 6 illustrate the transfer mechanism for shifting the information in the memory of FIG. 4 to the light control;

FIG. 7 illustrates diagrammatically the printing sprockets and associated rollers by which two complete prints of a given film negative can be prepared in a single pass through the printer of the instant invention;

FIG. 8 is a circuit diagram of the light module;

FIG. 9 is a timing chart of the cam operated switches in the light module; and

Figure 10A:
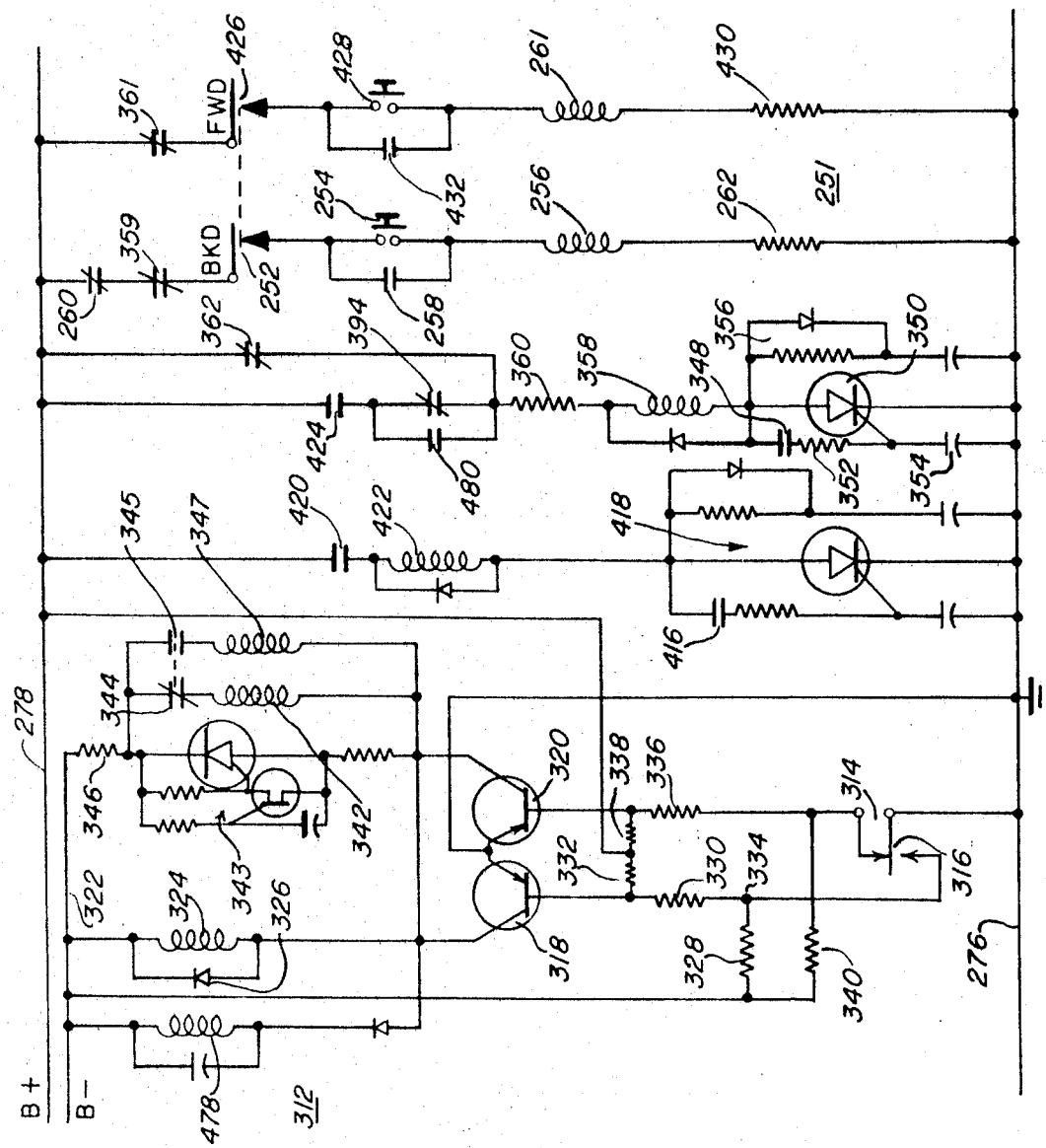
Figure 10C:
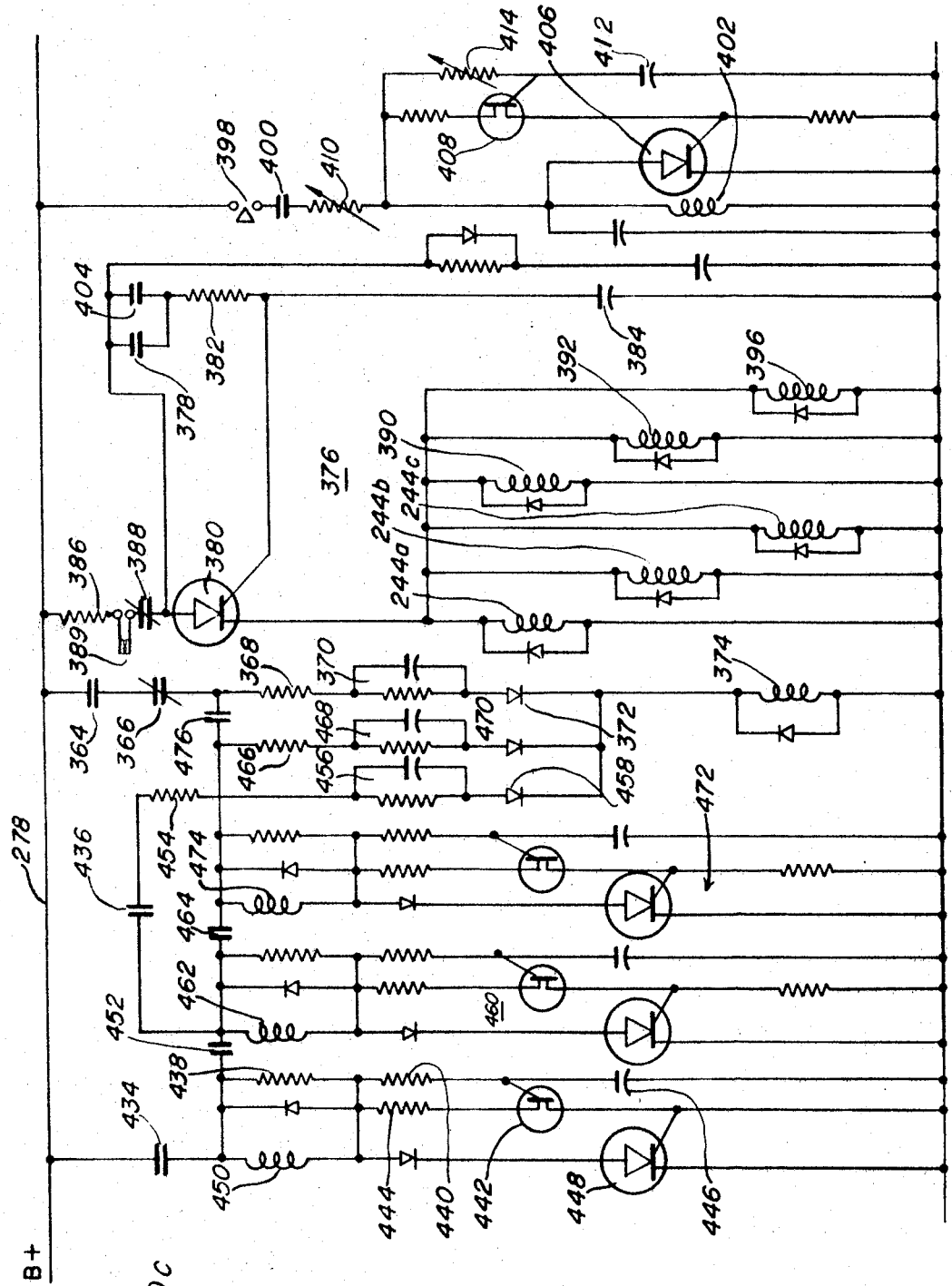

FIGS. 10a, 10b and 10c comprise a partial circuit diagram of one embodiment of the invention.

Referring now the drawings, and more particularly, to FIG. 1, the panel printer 10 comprises a sound section 12, a picture section 14, a forward supply spindle 16 for raw stock, a forward take-up spindle 18 for raw stock, a backward supply spindle 20 for raw stock and a backward take-up wheel 22 for raw stock. The two raw stock supply spindles 16 and 20 are normally enclosed in substantially light tight covers 23 shown partially broken away for illustrative purposes. With the raw stock thus enclosed, it is possible to thread the printer under daylight conditions. The sound negative runs between supply and take-up reels 24 and 26. Obviously, the direction of negative movement and the determination of which reel is a supply and which is a take-up will depend upon the direction of operation of the panel printer 10. The picture negative runs between supply and take-up spindles 28 and 30, the direction of movement and the characterization of the spindles again depending upon the direction of printer operation. Whenever the printer is in operation, irrespective of direction, all spindle motors are energized in the take-up direction to provide the desired tensioning. Internal circuitry, which will not be described in detail, provides the take-up torque of predetermined amounts at the appropriate times on the appropriate spindles 16–30 so that the spindle will take up the film as it passes through the equipment and maintain appropriate tension.

Similarly, each spindle 16–30 is provided with a lesser reverse torque when it is functioning as a supply reel in order to maintain appropriate tension in the film throughout the system. A follower 32 is provided on each of the spindles in order to hold the film in a tight reel as well as gauge the amount of film stored on the spindle. Conventional circuitry in the panel printer varies the torque applied to each of the spindles depending upon the amount of film stored on that spindle in order to maintain substantially constant tension.

Assuming the system is operating in the backward direction, picture negative is taken from supply spindle 30, passes over an idler roller 34 through a vacuum cleaner 36 of conventional design, a sprocket drive 40 and tensioning idler rolls 42 and into the first picture head 38. The head 38 may be of any conventional design, one such head being described in William W. Morris application, Ser. No. 548,229, filed May 6, 1966 and assigned to the assignee of the instant application.

The picture negative 44 is further threaded through a feed sprocket and idler system 46 over a second printing head 48 for the second track and through a set of appropriate rollers 47 and cleaner 49 to the take-up spindle 28. The sound negative 50 similarly is threaded from the supply spindle 26 through a cleaner 52, feed sprocket 54, sound head 56, further idlers and sprockets 57, a second sound head 58 for the alternate track, final idler rollers and sprocket 59 and a film cleaner 60 to the take-up spindle 24.

The raw film stock is taken from supply spindle 20 and, in the backward printing mode, follows the broken line path 62 over a drive sprocket 64, and film tensioning idler rolls 66 onto the first picture head 38. The raw stock 62 then is separated from the negative 44 and passed through snake-over rollers 47 more clearly shown in FIG. 7, whereby the raw stock is shifted transversely before it passes over the second picture printing head 48. The snake-over system disclosed in FIG. 7 provides positive indexing of the negative and raw film to insure synchronization of the two pictures and their respective sound channels in side by side relationship. This is insured by locking all of the feed and idler rollers during the loading operation and releasing the idler tensioning rollers for resilient bias of the film during actual printing operations. The raw stock 62 is further threaded over idler rolls 61 and sprocket 63 and onto the first sound head 56 where the first sound print is made. Thereafter, the raw film 62 is passed through a set of snake-over rollers 64 and onto the second sound head 58 where the print is completed. The exposed raw film is then passed onto take-up spindle 22.

For printing in the opposite direction, the forward supply spindle 16 provides raw film stock 68 which follows the solid line path into the printer and thereafter the broken line path already described through the printer to the point where the forward film 68 is stored on take-up spindle 18.

The light sources for the two picture printing heads 38 and 48 are within the enclosures 70 and 72, respectively, and the light is processed in the optical system contained within enclosures 74 and 76, respectively. These will be described in greater detail with respect to FIGS. 3–6. The light control systems contained in housings 74 and 76 are controlled for film travel in both directions by the two tape readers 78 and 80, respectively.

As mentioned above, the tape readers 78 and 80 may be of any conventional type such as that made by Tally Register Corporation of Seattle, Wash. and comprise a tape drive which steps the tape in response to electrical impulses, and a group of contacts which indicate when a hole is sensed. The manner in which the tape reader functions is disclosed and diagrammatically illustrated in Baumbach et al. Patent 3,121,786. The reader employs an eight hole one inch tape with a continuous set of small drive holes, each defining a discrete information position along the length of the tape. The reader includes circuits which automatically read the light information which is in binary form on six of the eight holes. The seventh hole is not utilized in this system and the eighth hole is used for stop and start information.

The various rollers and mechanical elements of the printer are controlled by the handle 82 which has Forward Reverse and Thread positions. This mechanical control insures that the proper rollers are tensioning the film depending upon the direction of travel and locks the idler rollers during threading to insure synchronous printing. The panel 84 includes all appropriate controls for the printer including forward footage counter, reverse footage counter, a cue counter and various push buttons on panel 84. Electrical meters for monitoring voltages and the like are mounted on panel 88, and knobs 90 control rheostats for voltage adjustment. Trimmer knobs 102 are provided on the two light valve systems to make preliminary trimming adjustments of the light intensity prior to operation of the light valves from the tape readers 78 and 80 and compensate for aging, color changes and the like.

The one inch information tape 104 and the picture negative 44 are diagrammatically illustrated in FIG. 2. Arrow 106 indicates the direction called "backward" operation which is the normal direction of operation in unidirectional printers and is from right to left in the printer and last scene to first scene on the film. Arrow 108 indicates the direction of "forward" operation which is a novel mode unique to the instant invention.

A notch 110 is associated with the beginning of the first scene of the negative 44. This first scene is diagrammatically indicated as film length 112 lying between two transverse lines and would usually be the picture tail. Similarly, a notch 114 appears near the beginning of the second scene 116 and so on to the last notch 118 introducing the final scene 120. Thereafter, a final notch 122 indicates zero cut or complete darkness in the film portion 124. In order for the system described above to function, the tape reader 78 must read the light information from the tape at the appropriate time, place the information in a light valve memory system and be prepared to read the necessary light valve information into the vanes prior to actual introduction of the particular scene into the printer. The tape 104 and light valve mechanism accomplish this by initial actuation of the reader through a circuit to be described whereby a synthetic pulse causes the first scene information (which would actually be tail exposure information) contained in tape segment 126 to be stored in a light valve memory before the printer comes up to speed and before notch 110 reaches the sensor. The system to be described utilizes an additive color system combining red, green and blue light. Thus, each tape segment between the arrows 96 includes a blank space and then three information positions. Generally, the red information is in position 97, the green in position 98 and the blue in position 99. The tape segment 126, for example, includes three steps of information corresponding to the red, green and blue portions of the light required for proper film exposure in the first scene. By altering the information coded in these three positions, not only color balance but total brightness are adjusted.

Furthermore, the inforamtion concerning the quantity of light is disposed transversely on the tape at each position and, as shown, the segment 126 for scene one has only a single information hole for each of the three colors. This is binary coded information which is utilized in the memory system in a manner to be described. The six holes represent light values 1, 2, 4, 8, 16 and 20 and in the conventional system fifty-one possibilities are offered. Thus, the first four scenes on tape 104 have the values 1, 2, 3 and 4.

The reader is actuated by a one revolution clutch operated cam switch assembly. Each time the clutch is actuated, the reader automatically senses three rows of information and then stops on an empty row such as the empty row 128 between the scene one and scene two information. This puts the scene one information into the valve memory. The reader will proceed to the next three rows of information only when the clutch is actuated by the scene one notch 110 in a manner to be described. When the last scene notch 118 of the negative 44 is sensed, the last scene information (which may be leader exposure) is put into the light valve while the zero cut or black information contained at segment 130 of the tape is put into the valve memory. When the last notch 122 is sensed, the zero cut is put into the actual light valve, the tape reader is stepped three additional steps where it senses a stop hole 132 in the eighth hole position, causing the reader to stop in the next position 134 and the entire printer ceases operation. It should be noted that by placing the stop hole 132 in the position normally occupied by blue information, synchronization is readily maintained.

While the illustration in FIG. 2 is highly diagrammatic, it is the practice to utilize a notch in the film negative which is approximately one inch long, (that is about one frame in 35 millimeter film) and to dispose the notch a fixed distance from the beginning of the scene. This distance is normally approximately four and one-half inches from the scene change to the middle of the notch which means that the notch sensing switch 136 associated with the first head 38 must be located approximately four and one-half inches in advance of the head and the sensor switch 138 must be similarly oriented relative to head 48. By this physical arrangement, sensing of the film notch by the switch 136 will cause the light source 74 to be modified at printing head 38 at the critical time of scene change in accordance with the information from tape reader 78. Sensor switch 138 similarly controls light valves in the control 76 in response to tape reader 80. Because of the nature of the electrical and mechanical system, a time delay is inherent in accomplishing the light change and in accordance with the teaching of this invention, that time delay is controlled to be approximately the time required for the film to move one-half the length of the notch whereby the actual light change will occur at substantially the same point on the film irrespective of direction of travel. Moreover, if the printer is operable at various speeds, the time delay can be coordinated with speed to insure proper light change at the time of scene change. The speed of the tape reader and printer is such that the system may be operated at up to 360 feet per minute and light changes can be accomplished at a rate of seven to eight scene changes per second. Thus, the cuing rate can be in the order of every fifteen frames and the actual light change accomplished in a few milliseconds.

In backward oepration described above, the printer circuitry generates a single synthetic cue pulse when it is started. This places zero cut in the light vanes and first scene information into memory. When the first cue 110 is sensed, first scene information is passed to the vanes and second scene information is put into memory.

In operating the printer in the forward direction, the system to be described automatically generates three synthetic cue pulses so that the start-stop hole 132 will cause the cam switch mechanism to step first to station 150 and then immediately through the tape segment 130 and 138 whereby the last scene is in memory before the zero cut notch 122 is sensed.

Thus, at the instant that the film 44 begins to run through the printer 10, the tape reader is resting at the station 140 on the information tape. When the cue sensor 136 senses the first notch 122 of film 44 when printing in the forward direction, the tape reader processes from position 140 to position 142, placing the last scene information from tape segment 138 into the light vanes and the next to the last scene information contained in tape segment 144 into the light valve memory.

Thereafter, the reader and printer operate in the same manner as in the backward mode until the third scene notch 113 is sensed. This places scene two information in the vanes and scene one in memory. The reader comes to rest on stop-start hold 148, but the circuit logic merely stores this information. When second scene notch 114 is sensed, the first scene tape information 126 is put into the light vanes and zero cut information from tape portion 146 is placed in the ligth valve memory system. At this juncture, the tape reader does not read a stop hole and, thus, the film and reader continue. When notch 110 is sensed, the zero cut is transferred to the vanes and the reader steps through one addition cycle and stops the system.

The light source and light valve are diagrammatically shown in FIG. 3. A single substantially white source 154 is contained within housing 70. The light is projected through appropriate condensers and heat shields 152 into a dichroic system of a conventional kind. The dichroic lens system 158–168 breaks the white light from source 154 into the three color components, red, green and blue. The lens 158 passes blue and green but reflects red along the broken line 170 onto the front surfaced mirror 171 and into the printing head 38. The light is projected through the printing aperture 172 where it impinges upon the film negative 44 and raw film stock 62. The light valve 174 is shown diagrammatically in FIG. 3. The two vanes rotate about their respective axes to pass a predetermined amount of light as determined by the tape programmer.

In a similar manner green light is reflected by the dichroic lens 168 through the green light valve 176 reflected by mirror 162 onto mirror 171 and projected into the printing head 38. The remaining blue light which passes through dichroic lens 168 is modulated by light valve 178 and reflected along path 180 where it is reflected by lens 164 and recombined with the red and green light for reflection by mirror 171 into the printing head 38 to provide light of the proper intensity and color balance on the negative 44.

The manner in which the individual light valves 174, 176 and 178 are modulated can be generally understood from FIG. 4. The bell crank 180 is pivoted about point 182 and the displacement of the ball 184 determines the degree to which the vanes of the light valve are to be closed. Thus, the displacement of the ball 184 about the axis 182 is an inverse indication of the amount of light desired on the film in accordance with the information stored on the tape. The conversion of the binary tape information into this rotary displacement is accomplished by the electromechanical system of FIG. 4 which is mounted in an appropriate housing in a known manner. The particular system described in FIGS. 4, 5 and 6 is a part of a commercially available light valve manufactured by Bell & Howell Company.

The bell crank 180 is displaced in response to pressure on a follower 186 which is moved in a counterclockwise direction whenever any one of the interference bars 188–198 is actuated. The six sensors in the tape reader are effective to actuate six coils 200–210 at a predetermined time in the reader cycle in the event that a given sensor reads a no hole condition in the tape. Each of these coils 200–210, when actuated, operates through an arm, only arm 211 being shown, to draw the respective interference bars 188–198 outwardly and because of the axially aligned rigid arrangement of the interference bars and intermediate rollers 212 and 214 outward motion of any or all of the interference bars produces counterclockwise rotary motion of bell crank 180. The ramps 216 on the interference bars 188–198 are of varying dimensions as is clear from the drawings. The dimensions of the ramps 216 vary from a unit light value of one on interference bar 188 through a value of twenty on interference bar 198. The light values, respectively, are one, two, four, eight, sixteen and twenty. By providing energization of various combinations of the six coils 200–210, fifty-one unique and incremental positions are defined for bell crank 180.

Arm 211 is urged upwardly by spring 213 and drives the interference bar 198 downwardly through a pin and slot arrangement when solenoid 210 is energized. When actuated arm 211 is engaged by latch 215 it maintains the interference bar in the extended position. At the beginning of a subsequent reading cycle the "unlatch" solenoid 217 is energized, moving rod 219 to the right in FIG. 4 against spring 221 to pivot the latches such as latch 215 and release all of the interference bars 188–198.

In addition to this digital control, the trimmer knob 102 is secured to shaft 218 which is threaded in the light valve frame 220 whereby rotation of knob 102 causes the entire assembly of interference bars to be urged axially to trim the light value for each of the digital positions.

The manner in which the digital information stored in the memory shown in FIG. 4 is converted into light valve operation is diagrammatically shown in FIGS. 5 and 6. The ball 184 of bell crank 180 engages a lever 222 which is urged downwardly by compression spring 224. Motion of bell crank 180 produces generally vertical motion of link 226 which rotates arm 228 about a read-out axis 230 against the tension of spring 232. The arm 228 is secured to a disk 234. Thus, the rotary position of disk 234 about axis 230 is an analog representation of the light value in the valve memory. Coaxial with the disk 234 is a valve control disk 238 carrying a pair of rollers 236 which is geared through spur gears 240 to the light vanes 242. The light vanes 242 are shown in FIG. 3 and directly determine the amount of light transmitted from the light source through the additive color system to the printing head.

The information in the memory system of FIG. 4 is transferred to the vanes 242 of FIG. 5 by the mechanism of FIG. 6. As diagrammatically shown in FIG. 6, a read-out solenoid 244, when energized, causes the disk 238 with the rollers 236 thereon to move downwardly against coil spring 246. When this occurs, the rollers 236 engage the ramps 248 of the memory and cause the output disk 238 to rotate so that the rollers 236 center at the bottom of the ramps 248 and effect a transfer of the stored data to the vanes. The rotary motion produced by the energization of read-out coil 244 provides motion through gears 250 and 240 to drive the vanes 242 and, thus, set the light information into the light valve. As soon as the rollers 236 have reached the bottom of ramps 248, coil 244 may be de-energized, the information has been transferred to the valves and the memory shown in FIG. 4 is free to receive further information.

The snake-over mechanism 48 by which two synchronized prints are made on a single piece of raw stock is best illustrated in FIG. 7. In one embodiment, two 16 MM sound prints are produced on a single roll of 35 MM film with three sprocket holes. In the "thread" position of handle 82 all of the sprockets and rollers of FIG. 7 are locked and, thus, as the raw stock 62 and negative 44 are laid in place they are positively indexed. The negative lies in a single plane and passes over a printing aperture 172 in the first printing head 38, idler rollers 46a and 46b, drive sprocket 46c and idler rollers 46d and 46e. The negative then passes over the second printing aperture 172a in head 48 and on to the take-up spindle 22.

The raw stock, 62, on the other hand, does not remain in one plane but the forward half is exposed over aperture 172 and it then passes over idler rollers 47a and 47b, canted rollers 47c and 47d, sprocket 47e and idler rollers 47f and 47g. The stock 62 has now been shifted forwardly along a rigid path so that the rearward half of the stock is aligned with aperture 172a. The angle of rollers 47c and 47d and the spacing between rollers 47b–47e are present to insure proper snake-over. Once threaded, the handle 82 is put in either the "forward" or "backward" position, releasing selected ones of the idler rollers such as rollers 46b, 46d, 47b and 47f so that they are resiliently shiftable transversely of their axes to provide proper tension in the film without damage to the sprocket holes.

Referring now to the circuit diagrams, FIGS. 8, 10a, 10b and 10c and the cam timing chart, FIG. 9, the circuit of the bi-directional printer will be briefly described. It will be understood that the circuits described are only rudimentary and in practice substantial additional circuitry is utilized for metering circuits, indicator lights, safety devices and interlocks. However, all such refinements are within the abilities of one skilled in the art when apprised of the basic teachings hereof. For example, all of the logic circuitry is duplicated in the described double head embodiment. However, the only significant circuit refinement required for double operation is a circuit to provide that the printer stops only after the second stop hole is reached.

In the drawings the ON-OFF circuits are shown on the right hand side of FIG. 10a, the READER DRIVE is shown in FIG. 10b, the START-STOP circuit is shown on the left side of FIG. 10a, the CUE PULSE GENERATOR is shown on the left side of FIG. 10c, the READ OUT circuit is shown on the right side of FIG. 10c and the light valve logic is shown in FIG. 8. These circuits will generally be described in the foregoing order with initial emphasis on backward operation which is normally the initial run when using the printer.

Power is applied to the main buses shown in the diagrams by circuits not described. After the film and stock have been threaded, the handle 82 is moved to the "backward" position, releasing the idler rollers, adjusting the torque controls on the supply and take-up motors, and closing the contacts 252 shown in the ON-OFF circuit 251 of FIG. 10a. Depression of the BACKWARD push button switch 254 then energizes relay 256 to initiate a backward printing cycle. Relay 256 closes contacts 258 which hold the relay energized when push button 254 is released. Contacts 260 are controlled by relay 261 in the forward circuit to prevent actuation of both circuits simultaneously and resistor 262 is protective.

As the tape is normally loaded in the unpunched leader portion, the reader drive circuit 264 of FIG. 10b is actuated when relay 256 closes contacts 266 and 268. The contacts 284 are closed whenever the printer is energized but not running as will be explained in due course with reference to FIG. 10a START-STOP. The unijunction device 270 comprises a negative resistance feedback oscillator utilizing resistors 272 and 274 connecting the unijunction bases between ground 276 and the B+ bus 278, and a control circuit including contacts 266, resistor 280 and capacitor 282. The circuit oscillates at a relatively slow rate and the output pulses are applied through closed contacts 284 and 268 and reversing contacts 286 to the backward stepping circuit of 288 of the reader drive. Reversing contacts 286 and 287 are controlled directly or indirectly by FORWARD relay 261. Thus, the reader steps the tape past the reading heads at a rate up to about 100 pulses per second.

The manual contacts 290 actuate the unijunction 270 through resistor 280 while manual switches 292 operate through a larger resistor 294 for a slow stepping mode. Switches 296 and 298 function with switches 290 and 292, respectively, to determine the direction of reader operation in SLEW or STEP mode.

Once the start hole 148 in tape 104 (FIG. 2) is sensed, all further reader drive pulses come from a motor driven cam set 300, 302, 304 and 306, which drives the tape through a red-green-blue-space sequence as will be described further. The timing sequence of these cam switches is illustrated in FIG. 9 where a reference numeral on a line corresponds to the cam contacts in the circuit diagrams. Cams 300–306 energize relay 308 which closes contacts 310 to apply stepping pulses to reader drive 288.

The START-STOP circuit 312 for the printer is shown on the left side of FIG. 10a and includes sensing switches 314 and 316 shown in the position that they assume when the tape is in position and no hole is sensed. When a stop-start hole is sensed, contacts 314 open and contacts 316 close. Under the "no hole" conditions shown, transistor 318 is biased to conduct and transistor 320 is biased off.

The grounded emitter circuit of transistor 318 is completed from a B-bus 322 through relay 324 and transistor 318 to ground bus 276. Relay 324 is provided with diode 326 as are many of the relays in the printer for protective purposes. Relay 324 maintains contacts 284 in the cue pulse generator of FIG. 10b closed except when a stop-start hole is sensed and then quickly opens that circuit to avoid a spurious pulse to the reader drive 288. The negative bias on transistor 318 is maintained from the B-bus 322 through resistor 328, resistor 330 and resistor 332 to B+ bus 278. Closure of contact 316 grounds point 334 and turns the transistor 318 off.

Transistor 320 has an identical bias circuit including resistors 336, 338, and 340 but is turned on when a stop hole is sensed. The collector circuit is designed to start the printer if it is stopped, and stop it if it is running. The circuit functons as follows: STOP-START hole opens contacts 314 and turns transistor 320 on. The first such occurrence in a run energizes relay 342 through normally closed contacts 344 and resistor 346. It also fires SCR circuit 343 which prevents the actuation of STOP relay 347 even though the transistor 320 may continue to conduct for some time. Relay 342 closes contacts 348 in a conventional SCR circuit which causes SCR 350 to conduct. Contacts 348 are connected from the SCR anode through resistor 352 to the control element with capacitor 354 connected to ground. The network 356 provides a bypass for transients which might otherwise cause the SCR 350 to fire without a control current. Current through SCR 350 energizes the main transport relay 358 through resistor 360 and normally closed contacts 362. Relay 358, through appropriate auxiliary controls, turns the printer on, starts the film transport, energizes the light sources, and comprises the main printer control. It also opens normally closed contacts 359 and 361, opening the on-off circuits 251, opens contacts 344 and closes contacts 345. Thus, upon energization of this relay, film and negative move through the printer in a backward printing cycle.

The cue pulse generator and read-out circuits to modulate the light during printing are shown in FIG. 10c. The tape of FIG. 2 is resting on hole 148 and, thus, the first segment must be placed in the light valve memory before the first scene cue 110 is sensed. The contacts 364 are closed by relay 358 completing a circuit through normally closed contacts 366 (which are controlled by forward relay 261), resistor 368, RC network 370, diode 372 and relay 374. The resistance of RC network 370 provides slightly less than the required holding current for relay 374 so that the relay pulls in with the augmented current through the capacitor and then releases, momentarily closing the associated contacts 378 in the read-out circuit 376. Closure of contacts 378 applies a firing current to the control element of SCR 380 through resistor 382 causing the SCR to conduct. Capacitor 384 provides transient protection and a slight time delay in firing the SCR.

The SCR circuit is completed from the B+ bus 278 through resistor 386, relay contacts 388, SCR 380, and a plurality of control devices in parallel. Solenoids 244a, 244b and 244c are the vane solenoids or read-out solenoids diagrammatically shown in FIG. 6. Thus, information stored in the memory of FIG. 4, in this case of the first pulse, zero cut information, is transferred to the vanes 242.

At the same time the clutch 390 is energized which drives the cam switch through one complete revolution, effecting the program charted in FIG. 9. Thus, the tape reader is stepped through the red, green and blue positions with closure of contacts 300, 302 and 304, and is then stepped by contacts 306 to the next space indicated by line 128 in FIG. 2.

The solenoid 392 is energized which opens contacts 394 in the START-STOP circuit 312 of FIG. 10a but this is ineffective as the contacts 362 remain closed. Finally, SCR 380 energizes relay 396 which opens contacts 388 above the SCR to turn the SCR off for protective purposes. Cam contacts 389 open the SCR circuit and prepare the circuit for subsequent energization.

Thus, the printer operates with zero cut information in the vanes 242 and first scene information in the light valve memory until the first notch 110 is sensed by the notch sensor 136 or 138. As already described, all of the circuitry associated with the first printing head is duplicated for the second, but is not shown in detail herein. The sensor closes notch contacts 398 in the read-out circuit 376 and contacts 400 are already closed by main relay 358.

Thus, the first scene notch 110 energizes relay 402 which, in turn, closes contacts 404 in the control circuit of SCR 380. Thus, the notch sensor functions in the same manner as the synthetic pulse produced by network 370, firing the SCR 380, placing the first scene information into the vanes and second scene information into memory.

The relay 402 is in parallel with an SCR 406 which is fired by the unijunction 408 shortly after contacts 398 close. The parallel combination of the SCR 406 and the relay 402 is in series with dropping resistor 410 to insure that relay 402 drops out in a few milliseconds and avoids the possibility of an inadvertent second cycle of the read-out circuit. Capacitor 412 and variable resistor 414 determine the duration of the delay and can be adjusted as required.

Subsequent notches 114 and 116 cause the circuit to operate in the manner described transferring light information sequentially from the tape to memory to the vanes 242. When the tape is cycled by the cam switches upon sensing the zero cut notch 122, the zero cut information from tape segment 130 is put into the vanes 242 and the cam switch is again cycled. In what is usually the blue data position, a stop hole 132 is sensed but the reader continues to take one additional step and stop.

The stop cycle is effected by stop-start circuit 312. The hole 132 causes transistor 320 to conduct, which energizes relay 347 through contacts 345 which are held closed by main relay 358. Actuation of relay 347 closes contacts 416 which fires a conventional SCR circuit 418. Contacts 420 were previously closed and are held closed by main relay 358 and relay 422 is thereby actuated. This opens contacts 362 and contacts 424 are open, permitting main relay 358 to be deactuated, stopping the entire printer. The reader drive has completed its cycle whereby the reader rests at position 134 on the tape of FIG. 2.

The printer is now in condition for "forward" operation, that is operation from left to right. In forward operation the handle 82 is moved to FORWARD, closing contacts 426 in the ON-OFF circuit 251 of FIG. 10a. Push button 428 then energizes relay 261 through closed contacts 361 and resistor 430. Relay 261 closes holding contacts 432 and automatically initiates forward operation.

As the reader is already indexed, no special reader drive pulses are required, but as explained, three synthetic cues are necessary. Relay 261 closes contacts 434 and 436 in the cue pulse generator. Contacts 434 apply voltage through resistors 438, 440 and 444 to unijunction 442. After a time delay in the order of 100 milliseconds determined by capacitor 446, the unijunction 442 fires the SCR 448 which actuates relay 450. Relay 450 closes contacts 452 and applies B+ from bus 278 through closed contacts 436, resistor 454, RC network 456 and diode 458 to stepping relay 374. As already discussed, relay 374 closes contacts 378 which fires SCR 380 and actuates vane solenoids 244a, 244b and 244c, clutch 390, relay 392 and reset relay 396 which opens contacts 388. This cycles the reader to position 150 leaving zero cut in the vanes.

Closure of contacts 452 fires SCR circuit 460 in the manner described and actuates relay 462, closing contacts 464 to apply a second pulse to relay 374 through resistor 466, network 468 and diode 470. This steps the reader through the segment 130 on tape 104.

Closure of contacts 464 actuates SCR circuit 472 and energizes relay 474 which closes contacts 476. Contacts 366 were previously opened by relay 261 and, thus, network 370 produces a third synthetic cue pulse in relay 374 which again steps the reader to the position 140 where the last scene is in memory and zero cut is in the vanes.

The circuit now rests until the zero cut notch 122 is sensed when it puts last scene information into the vanes and operates in the same manner as in the backward mode. In the meantime, the stop-start hole 132 has actuated the stop-start circuit 312 actuating relay 342 which in turn closes contacts 348 to close main relay 358 and start the printer. It is important that contacts 424 are held closed by relay 261 providing two actuating paths.

Printing proceeds normally until the third scene notch transfers first scene information into the memory and the reader rests on stop-start hole 148. This causes transistor 320 to conduct actuating stop relay 347 which opens contacts 362. The read-out circuit also actuates relay 396 which opens contacts 394. Finally, a circuit not used in backward operation is energized by transistor 320 to actuate relay 478 to close contacts 480. Thus, the main relay 358 is maintained in the actuated condition through contacts 480 and 424 and the reader cycles in response to the next cue 114 putting first scene information into memory and second scene into the vanes. The reader now rests at line 105 on tape 104. There is no stop-start hole at that point so relay 478 is de-energized and contacts 480 are open.

When first scene cue 110 is sensed, the vanes go to zero cut and the reader steps through another cycle to point 152. In so doing, relay 392 is again energized, opening contacts 394 whereby the main relay 358 is de-energized and the forward cycle is complete.

The light valve logic of FIG. 8 is designed primarily to insure the proper entry of tape information into the solenoids of the light valves. In read sensing circuit 488 cam contacts 482 close to enable to RED reed relays 484a–f to sense the six channels of color data through sensing contacts 486a–f. Identical circuits 490 and 492 are provided for the green and blue information and they are enabled by cam contacts 494 and 496, respectively.

When any reader contact senses the absence of a hole during the time the associated cam contacts 482, 494 or 496 are sequentially closed, the corresponding reed relay 484 is actuated closing contacts 498 in RED SCR circuits 500. Only one circuit is shown in detail as the remainder are identical as are the GREEN circuits 502 and BLUE circuits 504. The SCR circuits has been explained above and merely functions as a quick acting holding circuit to actuate the corresponding solenoids 200. When cam contacts 506, 508 and 510 sequentially close, they enable the SCR circuits according to the sequence set forth in FIG. 9.

Each light valve also has an unlatch solenoid 217R, 217G and 217B and these are actuated respectively by the cam contacts 512, 514 and 516 when the printer is operating in the backward direction.

When operating in the forward direction it will be apparent that the tape information is actually read in the inverse order, namely BLUE-GREEN-RED. Thus, forward relay 261 controls a plurality of normally closed contacts 518 and normally open contracts 520 which will apply the information which is read first to the BLUE contacts and the information which is read last to the RED contacts for forward operation. The green data is, of course, unaffected.

Without further elaboration, the foregoing will so fully explain the character of the invention that others may, be applying current knowledge, readily adapt the same for use under varying conditions of service, while retaining certain features which may properly be said to constitute the essential items of novelty involved, which items are intended to be defined and secured by the following claims.

We claim:

1. Motion picture copying equipment for producing a plurality of copies on raw film from an original comprising:
    a film support defining a printing aperture;
    a variable light source projecting light through said printing aperture;
    supply and take-up means for said original;
    drive means for bi-directionally driving said original between said supply and take-up means and past said printing aperture;
    first supply and take-up means for raw film;
    first drive means for driving raw film in a first direction from said first supply to said first take-up means in juxtaposition with said original past said printing aperture;
    second supply and take-up means for raw film;
    second drive means for driving said raw film in the second direction from said second supply means to said second take-up means in juxtaposition with said original past said printing aperture; and
    single means controlling the operation of said light source and said drive means for operation of said copying equipment bi-directionally.

2. The motion picture copying equipment of claim 1; information means being provided for controlling the light from said light source during operation of said equipment to vary the exposure of said raw film in accordance with the scenic content of said original, said single control means being synchronously responsive to said information means and scenic content irrespective of the direction of travel of said original.

3. The motion picture copying equipment of claim 2 wherein said information means comprises a tape reader and an elongate tape having sequential data thereon, said tape reader being stepped in accordance with the scenic content of said original and being movable in either direction to control said equipment.

4. The motion picture copying equipment of claim 3; said original being provided with a marker for each required light change, sensing means being provided to sense said marker and to control said light source in accordance with the information on said tape irrespective of the direction of travel of said original.

5. The motion picture copying equipment of claim 4; said equipment including memory means connected between said tape reader and said variable light source whereby information from said tape is sensed and stored in said memory means for each scene prior to the beginning of said scene passing said aperture, and read-out means responsive to said sensing means for transferring said information from said storage means to said variable light source at the beginning of said scene, irrespective of the direction of travel of said tape and said original.

6. The motion picture copying equipment of claim 5 wherein said variable light source comprises a substantially constant intensity source and shutter means disposed between said constant intensity source and said printing aperture, the setting of said shutter means being controlled by said read-out means at the beginning of each scene irrespective of the direction of travel of said tape and said original.

7. The motion picture copying equipment of claim 6 wherein said variable light source includes a plurality of effective light sources, each of a different color and a shutter means for each of said effective light sources disposed between said effective light source and said printing aperture, the setting of said plurality of shutter means being independently controlled by said read-out means at the beginning of each scene to control the density and color balance of the light passing through said aperture irrespective of the direction of travel of said tape and said original.

8. The motion picture copying equipment of claim 7 wherein said marker extends along said original for a length corresponding to approximately twice the length of film passing said aperture during the actuating time of said read-out means whereby said shutter means is adjusted for a new scene at the same position along said original irrespective of the direction of travel of said tape and said original.

9. The motion picture copying equipment of claim 8 wherein said light source comprises a single substantially white primary light source, a dichroic system providing red, blue and green beams of light from said primary light source, a variable aperture means in each of said beams, and means to recombine said beams at said picture aperture, said tape containing light information for each of said variable aperture means for each scene, said information for said three variable aperture means being stored sequentially on said tape and being transferred to said memory means prior to the beginning of the respective scene, irrespective of the direction of travel of said tape and original.

10. Motion picture copying equipment for producing two images in side by side relationship on raw film from a single original comprising:
    means transporting said raw film along a film path between supply and take-up means;
    means transporting said original along an original path between supply and take-up means;
    means defining a first printing aperture in said original path;
    means defining a second printing aperture in said original path displaced longitudinally from said first printing aperture;
    raw film support means between said printing apertures;
    original support means disposed between said printing aperture;
    each of said support means comprising a plurality of rotatable members including at least one rotatable member movable transversely to the rotatable axis thereof and resiliently urged toward said path;
    means locking said movable members against transverse movement to insure synchronized threading of said film and original; and
    offsetting means in one of said support means defining a path which is transversely offset with respect to the other path whereby said two side by side images are formed at said printing apertures.

11. The equipment of claim 10 wherein said offsetting means comprises a plurality of rotatable means having axes of rotation defining an acute angle relative to the associated path.

12. The equipment of claim 11 wherein one of said paths lies substantially in a single plane and said support means comprises a plurality of rollers substantially normal to said plane.

13. The equipment of claim 12 wherein the other of said paths has a first portion lying in a first plane and a second portion lying in a second plane transversely displaced from said first plane, said offsetting means lying between said portions.

14. In motion picture copying equipment for producing a plurality of copies on raw film from an original irrespective of the direction of travel of the film and original through the equipment wherein markers are disposed at spaced points on said original to generate effects indicating changes in the copying light and wherein a separate sequential record means is utilized to determine said light changes in response to said markers the improvement comprising means generating a plurality of synthetic effects at the beginning of a copying cycle, and means responsive to the direction of travel to determine the number of synthetic effects applied to said record means.

15. The motion picture copying equipment of claim 14 wherein means is provided to continue operation of said equipment at the end of said sequential record means for a predetermined time in response to said markers to compensate for said synthetic effects.

References Cited

UNITED STATES PATENTS

| 2,205,540 | 6/1940 | Phillimore | 355—98 |
| 2,943,554 | 7/1960 | Kastner | 355—88 |
| 2,990,762 | 6/1961 | Baumbach et al. | 355—111 |

NORTON ANSHER, Primary Examiner

RICHARD L. MOSES, Assistant Examiner

U.S. Cl. X.R.

355—98

PO-1050
(5/69)

UNITED STATES PATENT OFFICE
CERTIFICATE OF CORRECTION

Patent No. 3,458,256                Dated July 29, 1969

Inventor(s)  Henry F. Stemke

It is certified that error appears in the above-identified patent and that said Letters Patent are hereby corrected as shown below:

```
Column 1, - patent (top) - change
      "15 claims" to -- 11 claims --;
Column 1, - line 29, change "to reproduce"
      to -- or reproduce --;
Column 1, line 51, change "released" to
      -- related --;
Column 2, line 63, change "now the drawings"
      to -- now to the drawings --;
Column 3, line 40, change "47" to -- 45 --;
Column 3, line 49, change "64" to -- 65 --;
Column 5, line 5, change "inforamtion"
      to -- information --;
Column 5, line 69, change "oepration"
      to -- operation --;
Column 6, line 24, change "ligth" to
      -- light --;
Column 7, line 66, change "48" to
      -- 47 --;
Column 11, line 59, change "read" to
      -- red --;
Column 12, line 11, change "contracts"
      to -- contacts --;
Column 12, line 18, change "be" to
      -- by --;
Column 12, line 24, change "We claim"
      to -- I claim --;
Delete claims 10-13;
Renumber claims 14 and 15 as claims 10 and 11.
```

SIGNED AND
SEALED
MAY 12 1970

(SEAL)
Attest:

Edward M. Fletcher, Jr.
Attesting Officer

WILLIAM E. SCHUYLER, J
Commissioner of Patent